United States Patent [19]

Carroll

[11] Patent Number: 4,980,064
[45] Date of Patent: Dec. 25, 1990

[54] CYCLONE SEPARATOR WITH ENLARGED UNDERFLOW SECTION

[75] Inventor: Noel Carroll, Sassafras, Australia

[73] Assignee: Conoco Specialty Products Inc., Houston, Tex.

[21] Appl. No.: 283,959

[22] PCT Filed: Apr. 22, 1987

[86] PCT No.: PCT/AU87/00118
§ 371 Date: Nov. 21, 1988
§ 102(e) Date: Nov. 21, 1988

[87] PCT Pub. No.: WO87/06502
PCT Pub. Date: Nov. 5, 1987

[30] Foreign Application Priority Data
Apr. 23, 1986 [AU] Australia ................ PH5594/86

[51] Int. Cl.$^5$ ............................................. B01D 17/38
[52] U.S. Cl. .................... 210/512.1; 55/459.1; 209/144; 209/211; 210/512.3
[58] Field of Search ............. 210/512.1, 512.2, 512.3, 210/788; 209/144, 211; 55/459.1

[56] References Cited
U.S. PATENT DOCUMENTS

| | | | |
|---|---|---|---|
| 3,489,286 | 1/1970 | Estabrook | 210/512.1 |
| 3,501,014 | 3/1970 | Fitch et al. | 210/512.1 |
| 3,716,137 | 2/1973 | Frykhult | 210/512.1 |
| 4,237,006 | 12/1980 | Colman et al. | 210/512.1 |
| 4,464,264 | 8/1984 | Carroll | 209/211 |
| 4,576,724 | 3/1986 | Colman et al. | 210/512.1 |
| 4,820,414 | 4/1989 | Carroll et al. | 210/512.1 |

FOREIGN PATENT DOCUMENTS 159274 7/1952 Australia ................ 210/512.1

Primary Examiner—Frank Spear
Assistant Examiner—Joseph Drodge
Attorney, Agent, or Firm—John E. Holder

[57] ABSTRACT

A cyclone separator with an inlet and two outlets for separating oil and water from an oil-water mixture wherein the separation chamber has a large diameter inlet end and a smaller diameter underflow outlet end. The overflow is arranged as an axial outlet at the inlet end of the chamber. The underflow outlet end is provided with a cone shaped portion of increasing diameter in the direction of flow and a choke portion downstream of the cone shaped portion, the choke having a reducing diameter configuration.

14 Claims, 1 Drawing Sheet

CYCLONE SEPARATOR WITH ENLARGED UNDERFLOW SECTION

BACKGROUND OF THE INVENTION

This invention relates to cyclone separators

The invention has particular, but not exclusive, application in liquid-separators, particularly separators for separating oil and water from an oil-water mixture such as of the kind described in International Application No. PCT/AU83/00028, U.S. Pat. specification No. 4,464,264, U.S. Pat. specification No. 4,576,724 or U.S. Pat. specification No. 4,237,006.

SUMMARY OF THE INVENTION

According to the invention there is provided a cyclone separator having an elongate separating chamber extending from a larger diameter end to a smaller diameter end, and having an overflow outlet at the larger diameter end, an underflow outlet at the smaller diameter end and inlet means, for inlet of fluid to be separated to the separating chamber, at a lengthwise location at least adjacent the larger diameter end; wherein the underflow outlet leads to an axially extending end portion of the separator, through which, in use of the separator, outflow from the underflow outlet passes, said end portion extending from a smaller diameter end to a larger diameter end, the smaller diameter end of the end portion being closest to the larger diameter end of the separating chamber. Preferably, said end portion is of frustoconical form with conicity (half-angle) in the range 6° to 20°, preferably 8°. A restrictive choke may be provided downstream of the end portion and is in a generally frustoconical form decreasing in diameter away from the end portion.

BRIEF DESCRIPTION OF THE DRAWING

The invention is further described by way of example only with reference to the accompanying drawing, the single FIGURE of which is a cross sectional diagram of a cyclone separator constructed in accordance with the invention.

BRIEF DESCRIPTION OF THE PREFERRED EMBODIMENTS

Figure 1:
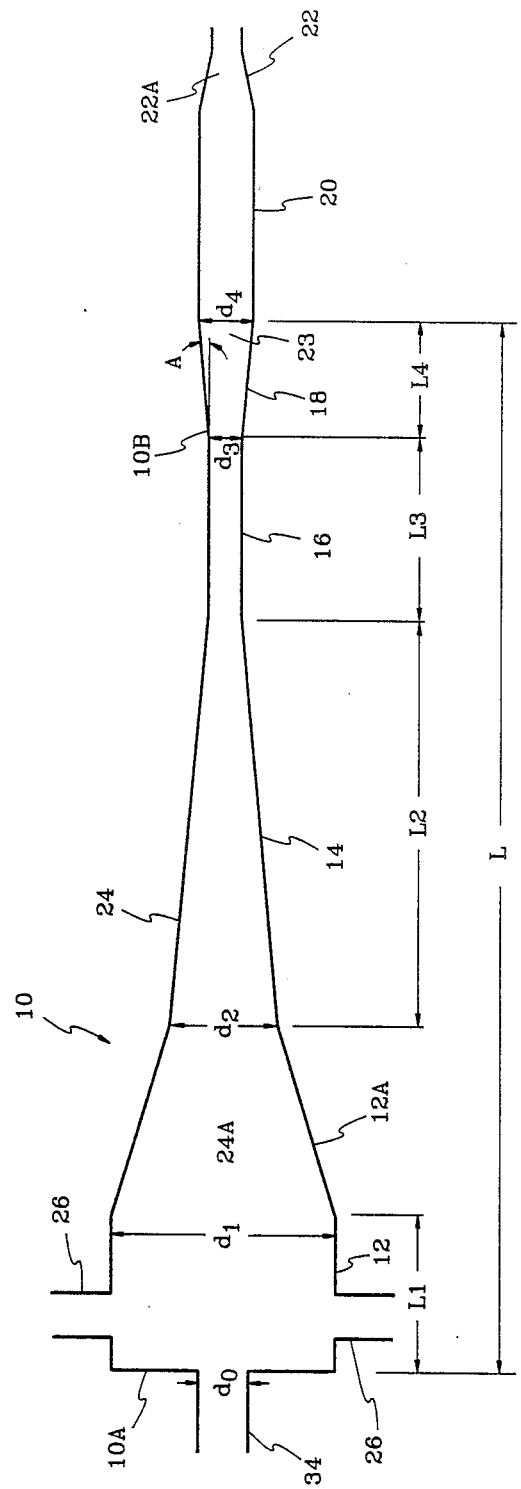

The exemplary cyclone separator shown comprises an outer casing 24 which defines an elongate separating chamber 24a therewithin. The separating chamber is axially symmetrical and of circular transverse cross section. Chamber 24a extends from a larger diameter end 10a of the separator to a smaller diameter end 10b of the separator. In this instance, the separating chamber defines a first portion 12 of cylindrical form, a second tapered portion 14, which tapered portion 14 in turn leads to a third portion 16 of cylindrical form. A tapered portion 12a extends between portions 12, 14. Portion 16 presents, at its end remote from portion 12, an underflow outlet 23. The portion 16 thence leads to an end portion 18 of the separator. The separating chamber 24a has an underflow outlet 23, for the denser fluid, this being located at the end of portion 16 remote from the larger diameter end 10a of the separator. The separating chamber 24a also has one or more tangential fluid inlets 26 positioned adjacent the larger diameter end of the separator and an axial overflow outlet 34 arranged at the larger diameter end (for outflow of the less dense of the components of the fluid to be separated)

The separator 10 is designed specifically, in this particular instance, for separation of oil from an oil-water mixture, the mixture being admitted via inlets 26, the separated water being taken off via outlet 23 and the separated oil being taken off via outlet 34. Separators of this or other type suitable for separating liquid components one from the other are generally designed to ensure relatively low shear stress within the liquid as it is moving within the separating chamber 24a. International Application PCT/AU83/00028, U.S. Pat. specification No. 4,464,264, Australian patent specification No. 84713/82 and U.S. Pat. specification No. 4,237,006 describe cyclone separators effective for separating oil from an oily water mixture where water predominates. These disclose particular configurations and dimensional constraints applicable to this type of separator. Generally these separators are characterized by having relatively long length to diameter ratio, for example the diameter $d_1$ at the larger diameter end of the separator may be related to the overall length of the separator so that the overall length "L" is at least five times the diameter $d_1$. More particularly, the separator may be characterised by the following:

$$10 \leq l_2/d_2 \leq 25$$

$$0.04 \leq 4A_i/\pi d_1^2 \leq 0.10$$

$$d_O d_2 < 0.25$$

$$d_1 > d_2$$

$d_2 > d_3$, where $d_1$, $d_2$, $d_3$ and $l_1$, $l_2$, $l_3$ are the diameters and lengths of the first portion 12, second portion 14 and third portion 16, respectively, $A_i$ is the total cross sectional area of the or of all of the inlets 26 measured at the points of entry normal to the inlet flow, and $d_O$ is the diameter of the outlet 34.

Where provided, the tapered portion 12a may have a taper whose conicity (half-angle) is 10°. The portion 14 may have a taper whose conicity (half-angle) is 20' to 1°. Where a portion such as portion 14 is tapered, the respective diameter such as diameter $d_2$ thereof in the above formulae is to be taken as the diameter thereof at the largest diameter end. These ratios are described in U.S. Pat. Nos. 4,576,724 and 4,237,006. In a particular form, disclosed in U.S. Pat. No. 4,576,724, the following relationship applies:

$$d_O d_2 < 0.1.$$

The portion 18 is of frustoconical form increasing, away from the outlet 23 from a diameter $d_3$ at the end closest the outlet 23 to a diameter $d_4$ at the end remote therefrom. The conicity (half-angle) "A" of the portion 18 may be 8° and portion 18 may be of length $l_4$ rather more than the smallest diameter $d_3$ thereof such as $1 < l_4/d_3 < 5$. In accordance with conventional practice, the outlet 23 may be coupled such as via a pipe 20 through a suitable flow restricting means, or choke 22, which may be constructed in accordance with the teachings of U.S. Pat. specification No. 4,464,264, or International Application PCT/AU83/00028 for outflow therefrom of the denser liquid (water in this instance) from the separator. Particularly, the flow restricting means may present a passageway 22a which is of generally frustoconical form decreasing in diameter away from the end portion 18 to a diameter at the end remote from the end portion 18 which is in the range ⅓ to ⅜ the diameter of the passageway 22a at the end adjacent end portion 18.

The provision of the portion 18 has been found to be particularly useful in that it permits a relative shortening of the length of the separator as compared with its diameter, as compared with what would be the case otherwise. As mentioned, separators for separating liquid components, particularly the aforementioned oily water mixtures, are generally characterized by being of relatively great length and the reduction in length achievable by use of the portion 18 is therefore of practical significance in enabling fitment of separators into confined spaces and, furthermore, in reducing manufacturing costs. The provision of the portion 18 is thought to facilitate operation by permitting recovery of a dynamic pressure head loss which normally occurs in the operation of separators of the kind in question. In particular, there will normally be a substantial static pressure loss from the inlets 26 to the outlet 23 of the separator, and the frustoconical configuration of the portion 18 aids in minimising this loss.

As described in International Application PCT/AU85/00010, the multiple tangential inlets 26 shown may be replaced by a single inlet of involute form.

I claim:

1. A cyclone separator comprising elements designed, sized and arranged for treating an oil-water mixture for separating the more dense water component from the less dense oil component thereof, said separator having an elongate separating chamber including a tapered portion extending from a larger diameter end to a smaller diameter end, and having an overflow outlet at the larger diameter end, an underflow outlet at the smaller diameter end and having a substantially cylindrical portion adjacent the smaller diameter end and extending downstream thereof, and inlet means for inlet of fluid to be separated to the separating chamber at a lengthwise location adjacent the larger diameter end; wherein the underflow outlet leads to an axially extending end portion of the separator, through which in use of the separator, outflow from the underflow outlet passes, said end portion extending from a smaller diameter end to a larger diameter end, the smaller diameter end of the end portion being closest to the larger diameter end of the separating chamber, and further wherein said separating chamber comprises first, second and third chamber portions axially arranged in that order, the inlet means comprising at least one inlet open to the first portion, the overflow outlet and underflow outlet being arranged to axially outlet from the first portion and the third portion respectively, and wherein the first and third portions are of substantially cylindrical form and the second portion is the tapered portion extending from a larger diameter end to a smaller diameter end, where $l_1$, $l_2$ and $l_3$ are the lengths of the first, second, and third portions respectively, where $d_1$ is the diameter of the first portion $l_1$ and $d_2$ is the diameter at the largest end of the second portion $l_2$, and where $d_1$ is greater than $d_2$ to form a tapering transition portion between the first portion and the second portion.

2. A cyclone separator as claimed in claim 1 wherein said end portion is of frustoconical form, with a conicity (half-angle) in the range of 6° to 20°.

3. A cyclone separator as claimed in claim 2 wherein the conicity (half-angle) of the end portion is substantially 8°.

4. A cyclone separator as claimed in claim 2 wherein the end portion is longer than the diameter thereof at the smallest diameter end of the end portion.

5. A cyclone separator as claimed in claim 4 wherein $$1 < l_4/d_3 < 5,$$

where $l_4$ is the length of the end portion and $d_3$ is the diameter of the end portion at its smallest diameter end.

6. A cyclone separator as claimed in claim 1 including flow restriction means coupled to the larger diameter end of said end portion to restrict flow from the end portion.

7. A cyclone separator as claimed in claim 6 wherein said flow restricting means comprises a passageway having a portion which decreases in diameter away from said end portion to a diameter at the end of the passageway portion remote from said end portion which is in the range ⅓ to ⅔ of the diameter of the passageway adjacent said end portion.

8. A cyclone separator comprising elements designed, sized and arranged for treating an oil-water mixture for separating the more dense water component from the less dense oil component thereof, said separator having an elongate separating chamber with a tapered portion extending from a larger diameter end to a smaller diameter end, and having an overflow outlet at the larger diameter end, an underflow outlet at the smaller diameter end and having a substantially cylindrical portion adjacent the smaller diameter end and extending downstream thereof, and inlet means for inlet of fluid to be separated to the separating chamber at a lengthwise location adjacent the larger diameter end, wherein the underflow outlet leads to an axially extending end portion of the separator, through which in use of the separator, outflow from the underflow outlet passes, said end portion extending from a smaller diameter end to a larger diameter end, the smaller diameter end of the end portion being closest to the larger diameter end of the separating chamber, wherein said separating chamber comprises first, second and third chamber portions axially arranged in that order, the inlet means comprising at least one inlet open to the first portion, the overflow outlet and underflow outlet being arranged to axially outlet from the first portion and the third portion respectively, and wherein the first and third portions are of substantially cylindrical form and the second portion is said tapered portion, wherein $$10 \leq l_2/d_2 \leq 25$$

$$0.04 \leq 4A_i/\pi d_1^2 \leq 0.10$$

$$d_0 d_2 < 0.25$$

$$d_1 > d_2$$

$$d_2 > d_3$$

where $l_1$, $l_2$ and $l_3$ are the lengths of the first, second and third portions respectively, $d_1$ and $d_3$ are the diameters of the first and third portions respectively, $d_2$ is the diameter of the second portion at its largest diameter end, $d_0$ is the diameter of the overflow outlet and $A_i$ is the total cross-sectional area for inflow of material to the separating chamber as presented by the inlet means and measured at the points of entry normal to inlet flow.

9. A cyclone separator as claimed n claim 8 including a tapered portion of the separating chamber, joining said first and second portions thereof.

10. A cyclone separator as claimed in claim 8 wherein the conicity (half-angle) of the second portion is in the range 20' to 1°.

11. A cyclone separator as claimed in claim 8 wherein $d_0 d_2 < 0.1$.

12. A cyclone separator having elements designed, sized, and arranged for treating an oil-water mixture for separating the more dense water component from the less dense oil component thereof, said separator having an elongated separation chamber with a tapered portion extending from a larger diameter end to a smaller diameter end, an overflow outlet at the larger diameter end for outflowing the less dense oil component of the mixture, an underflow outlet for outflowing the more dense water component of the mixture and inlet means for inlet of the fluid mixture to be separated, such separating chamber having a relatively long length to diameter ratio and being arranged to provide a low shear stress to liquids moving within the separating chamber, and further wherein said separating chamber comprises first, second and third chamber portions axially arranged in that order, the inlet means comprising at least one inlet open to the first portion, the overflow outlet and underflow outlet being arranged to axially outlet from the first portion and the third portion respectively, and wherein the first and third portions are of substantially cylindrical form and the second portion is the tapered portion extending from a larger diameter end to a smaller diameter end, where $l_1$, $l_2$ and $l_3$ are the lengths of the first, second, and third portions respectively, where $d_1$ is the diameter of the first portion $l_1$ and $d_2$ is the diameter at the largest end of the second portion $l_2$, and where $d_1$ is greater than $d_2$ to form a tapering transition portion between the first portion and the second portion, and end portion means arranged to extend from said third portion of said separation chamber at the smaller diameter end thereof for minimizing pressure head loss occurring in the separation process from the inlet to the underflow outlet of the separation chamber, said end portion means being frustoconically shaped and expanding in diameter as it extends away from said third portion of said separation chamber.

13. The cyclone separator of claim 12 and further including choke means on the water component outlet which is arranged downstream of said end portion means.

14. The cyclone separator of claim 13 wherein said choke means is of a frustoconical shape with the diameter of said choke means decreasing as it extends away from said end portion means.

* * * * *